United States Patent
Finnan (10) Patent No.: US 10,078,483 B2
(45) Date of Patent: Sep. 18, 2018

(54) DUAL SCREEN HAPTIC ENABLED CONVERTIBLE LAPTOP

(71) Applicant: Google LLC, Mountain View, CA (US)

(72) Inventor: Hugh Finnan, Seattle, WA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/156,834

(22) Filed: May 17, 2016

(65) Prior Publication Data

US 2017/0337025 A1 Nov. 23, 2017

(51) Int. Cl.
*G06F 3/14* (2006.01)
*G06F 3/01* (2006.01)
(Continued)

(52) U.S. Cl.
CPC .......... *G06F 3/1423* (2013.01); *G06F 1/1654* (2013.01); *G06F 3/016* (2013.01);
(Continued)

(58) Field of Classification Search
CPC .. G09G 3/3406; G09G 3/3413; G09G 3/3611; G09G 2320/0271; G09G 2320/0646; G09G 2320/0653; G09G 2360/16; G06F 1/1654; G06F 1/1647; G06F 1/1649
See application file for complete search history.

(56) References Cited

U.S. PATENT DOCUMENTS 5,914,585 A * 6/1999 Grabon .................. G06F 1/163
307/29
5,948,047 A 9/1999 Jenkins et al.
(Continued)

FOREIGN PATENT DOCUMENTS

| CA | 2750668 A1 | 2/2013 |
| JP | 3197452 U | 5/2015 |
| WO | 2013/091136 A1 | 6/2013 |

OTHER PUBLICATIONS

Combined Search and Examination Report for Application No. GB 1621146.8, dated May 26, 2017.
(Continued)

*Primary Examiner* — Mrunalini Yerneni Mummalaneni
(74) *Attorney, Agent, or Firm* — Lerner, David, Littenberg, Krumholz & Mentlik, LLP (57) ABSTRACT

A dual display client apparatus includes a pair of display housings. When physically coupled together in a first mode of operation, the display housings may be arranged as a single portable electronic device such as a clamshell laptop. In this mode, the system is configured to share computing power and other resources among the two housings, providing a more powerful and robust device than when the housings are separated. Processor power and storage capacity may be aggregated in the unitary apparatus. Battery charging and power sharing may be enabled between the devices' power supplies. When decoupled, the separate display housings are configured to each operate as a self-sufficient, standalone computing device. In this mode of operation, applications and other software may be instantiated as shared instance or separate instances, giving the user of each device ultimate flexibility in device operation and content consumption.

14 Claims, 11 Drawing Sheets

(51) Int. Cl.
    *G06F 3/0488*     (2013.01)
    *G06F 1/16*     (2006.01)
    *H04M 1/02*     (2006.01)

(52) U.S. Cl.
    CPC ...... *G06F 3/04886* (2013.01); *H04M 1/0262* (2013.01); *H04M 1/0266* (2013.01)

(56) References Cited

U.S. PATENT DOCUMENTS

| | | | |
|---|---|---|---|
| 6,295,038 B1 | 9/2001 | Rebeske | |
| 6,667,878 B2 | 12/2003 | Ponx | |
| 7,136,282 B1 | 11/2006 | Rebeske | |
| 8,266,551 B2* | 9/2012 | Boldyrev | G06F 9/542 715/701 |
| 9,077,792 B1 | 7/2015 | Alhaidar | |
| 2003/0132913 A1 | 7/2003 | Issinski | |
| 2003/0161094 A1 | 8/2003 | Chambers | |
| 2004/0049743 A1* | 3/2004 | Bogward | G06F 1/162 715/262 |
| 2005/0248502 A1* | 11/2005 | Okuley | G06F 3/1438 345/1.3 |
| 2008/0062625 A1 | 3/2008 | Batio | |
| 2010/0293462 A1* | 11/2010 | Bull | G06F 9/4445 715/716 |
| 2010/0321275 A1* | 12/2010 | Hinckley | G06F 1/1618 345/1.3 |
| 2011/0080490 A1 | 4/2011 | Clarkson et al. | |
| 2011/0106954 A1* | 5/2011 | Chatterjee | G06F 1/1632 709/227 |
| 2011/0201275 A1* | 8/2011 | Jabara | H04L 12/5692 455/41.2 |
| 2012/0208466 A1* | 8/2012 | Park | G06F 1/1601 455/41.3 |
| 2012/0256929 A1* | 10/2012 | Koenig | H04L 12/00 345/503 |
| 2012/0331059 A1* | 12/2012 | Luna | G06F 9/5016 709/204 |
| 2013/0145142 A1 | 6/2013 | Sainath et al. | |
| 2014/0241558 A1* | 8/2014 | Yliaho | H04R 5/02 381/333 |
| 2014/0299372 A1* | 10/2014 | Meazell | G06F 1/263 174/74 R |

OTHER PUBLICATIONS

Tandler et al., "ConnecTables: Dynamic Coupling of Displays for the Flexible Creation of Shared Workspaces", Proceedings of the 14th Annual ACM Symposium on User Interface Software and Technolc (UIST'01), ACM Press (CHI Letters 3 (2)), 2001, pp. 11-20.

Chen et al., "Navigation Techniques for Dual-Display E-Book Readers", CHI, Florence, Italy, Apr. 5-8, 2008, 10 pages.

Examination Report dated Mar. 28, 2018, for United Kingdom Patent Application No. 1621146.8. 4 pages.

* cited by examiner

DUAL SCREEN HAPTIC ENABLED CONVERTIBLE LAPTOP

BACKGROUND

There are a multitude of portable consumer electronic devices for various uses, including PDAs, mobile phones, tablet and laptop PCs, etc. Some of these are convertible computers, or devices that have detachable screens for use as tablets. However, once the screen or tablet portion is detached, the remaining portion of the device cannot be used independently. In addition, it is common for one person or a family to have many portable consumer devices. Each of those devices has its own cables, power requirements, etc. This is an inefficient use of resources, and may require a family to purchase additional devices so that the family members can each access content such as movies or games, surf the web, and so on.

BRIEF SUMMARY

Aspects of the technology involve portable computing systems (e.g., laptop clamshell computers) that include two haptic enabled tablet-type displays. Such systems can operate as one device when the displays are connected. But when decoupled, each operates as a fully self-sufficient computing device.

In one scenario, each half of the clamshell is able to operate as an independent computer. For instance, two family members could use each half of the system use to access/consume content, e.g., streaming movies, surfing the web, playing games, etc. Some obvious advantages of such a system include reducing the number of devices to carry on trips and the number of power cords to carry. Even when not traveling, this kind of system can greatly reduce the number of separate devices that a family would need.

In contrast, when the two halves of the device are coupled together, one of the displays could continue to function as a display screen, while the other could function as a haptic keyboard or other type of input apparatus. Here, the computing resources of both halves would operate in concert to enable the system to function more powerfully and efficiently. In this case, the system would be able to share computing power, application memory and storage. One benefit of this is that the system could act as a powerful laptop. But when needed (or desired), one could pull the screens apart and have two devices which function independently as tablets, which can be used by different individuals (e.g., family members) to access/consume content.

In accordance with aspects of the technology, a portable computing system is provided having first and second housings. The first housing includes a first display device having a display interface, first memory configured to store first instructions and first data, one or more first input and output devices, one or more first sensors devices, and one or more first processors coupled to the first display device, memory, input and output devices, and sensor devices. The second housing includes a second display device having a display interface, second memory configured to store second instructions and second data, one or more second input and output devices, one or more second sensor devices, and one or more second processors coupled to the second display device, memory, input and output devices, and sensor devices. When the first housing is physically coupled to the second housing, the one or more first processors and the one or more second processors operate in combination in a first mode to process at least one of the first instructions, the second instructions, the first data or the second data. And when the first housing is not physically coupled to the second housing, the one or more first processors operate separately from the one or more second processors in a second mode in which the one or more first processors do not process the second instructions or the second data, and the one or more second processors do not process the first instructions or the first data.

In one example, during the first mode, the first display device is configured to present content to a user, and the second display device is configured to receive input from the user to control presentation of the content on the first display device. The second display device may include a haptic input and is configured to present a virtual keyboard to the user, where the virtual keyboard may be arranged to provide tactile feedback to the user.

In another example, the first housing further comprises a first power module, the second housing further comprises a second power module, and in the first mode, one of the first and second power modules is configured to charge a battery of the other one of the first and second power modules. Here, the first power module may be configured to inductively charge the battery of the second power module.

In yet another example, in the first mode, the one or more first processors are configured to buffer content in the second memory.

According to a further example, in the second mode the one or more first processors are configured to implement a first instance of an active application for use by a first user, and the one or more second processors are configured to implement a second instance of the active application for use by a second user. Here, the second instance of the active application may be distinct from the first instance, so that different pieces of content are separately presentable to the first and second users. Alternatively, the second instance of the active application may be a shared version of the first instance, so that one piece of content is simultaneously presentable to the first and second users.

In accordance with aspects of the technology, a computer-implemented method for operation of a client apparatus is provided. The client apparatus has first and second housings, each housing including a display device. The method comprises determining, by one or more processors of the client apparatus, whether the first and second housings are physically coupled together; when it is determined that the first and second housings are physically coupled together, operating in a first mode including sharing selected resources between the first and second housings; and when it is determined that the first and second housings are physically separated from one another, operating in a second mode, the second mode including determining whether to disable one or more features enabled in the first mode.

In one example, sharing the selected resources between the first and second housings includes combining processor resources of the first and second housings. Combining the processor resources includes operating a processor from the first housing and a processor from the second housing as either parallel processors or as master and slave processors.

In another example, sharing the selected resources between the first and second housings includes virtually aggregating memories of the first and second housings to enhance buffering or long-term storage capacity.

In a further example, sharing the selected resources between the first and second housings includes sharing resources of power modules of the first and second housings. In this case, in the first mode, a power module of the first housing may be configured to charge a battery of a power module of the second housing.

In yet another example, sharing the selected resources between the first and second housings includes virtually aggregating network access elements of the first and second housings to increase uplink and downlink communication bandwidth of the client apparatus.

According to a further example, in the second mode one or more processors of the first housing are configured to implement a first instance of an active application for use by a first user, and one or more processors of the second housing are configured to implement a second instance of the active application for use by a second user. Here, the second instance of the active application may be distinct from the first instance, in which different pieces of content are separately presentable to the first and second users on respective display devices of the first and second housings. Alternatively, the second instance of the active application may be a shared version of the first instance, in which one piece of content is simultaneously presentable to the first and second users.

In another example, upon determining whether to disable one or more features enabled in the first mode, the method includes a processor of the first housing disabling haptic feedback on the display device of the first housing. And in yet another example, upon determining that the first and second housings are physically separated from one another, the method includes initiating a wireless communication link between transceivers of the first and second housings.

BRIEF DESCRIPTION OF THE DRAWINGS

Accompanying this specification is a set of drawings illustrating various features and aspects of the technology. In the drawings, like reference numerals refer to like elements. A brief discussion of each drawing is provided below.

The following description is based on embodiments of the claims and should not be taken as limiting the claims with regard to alternative embodiments that are not explicitly described herein.

DETAILED DESCRIPTION

Overview

The technology relates to a dual display client apparatus, which may be arranged as a laptop, tablet, netbook or other type of portable electronic device. As noted above, such an arrangement is configured to operate as one device when the displays are connected. And when decoupled, the separate parts of the system are configured to each operate as a self-sufficient, standalone computing device.

When operating as a single apparatus, the system is configured to share computing power and other resources. This can result in a more powerful and robust device than when the displays are decoupled. For instance, processor power and storage capacity may be virtually aggregated in the unitary arrangement. Charging and power sharing may be enabled between the batteries of the devices. And applications and other software of the client device arrangement may be configure to take advantage of enhanced processing power when the displays are coupled together, while retaining the ability to provide content on demand for different users when decoupled.

These features can be implemented in a variety of use cases and scenarios, which are discussed in detail below. However, for ease of understanding, an example dual display client device arrangement is presented first.

Example Arrangement

Figure 1A:
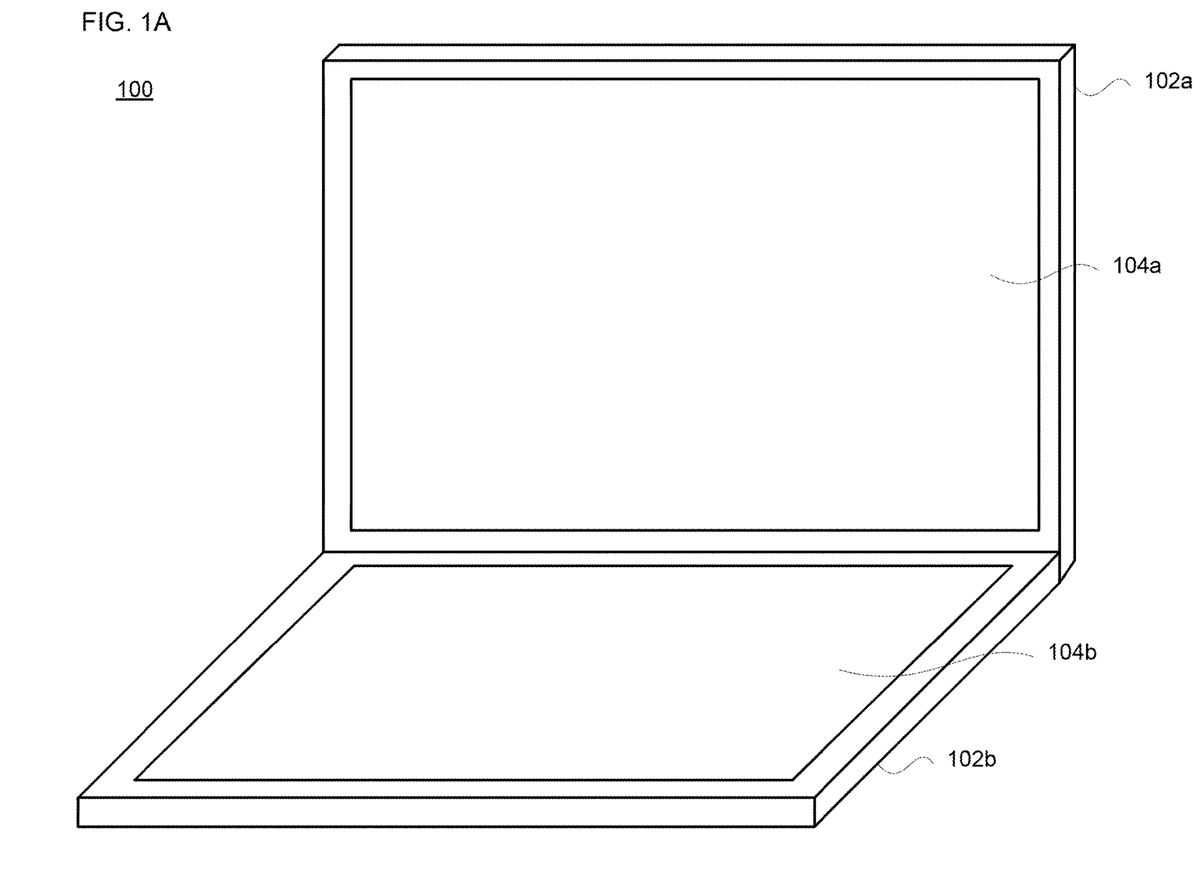
FIGS. 1A-B illustrate an example dual display client device arrangement according to aspects of the disclosure.
Figure 1B:
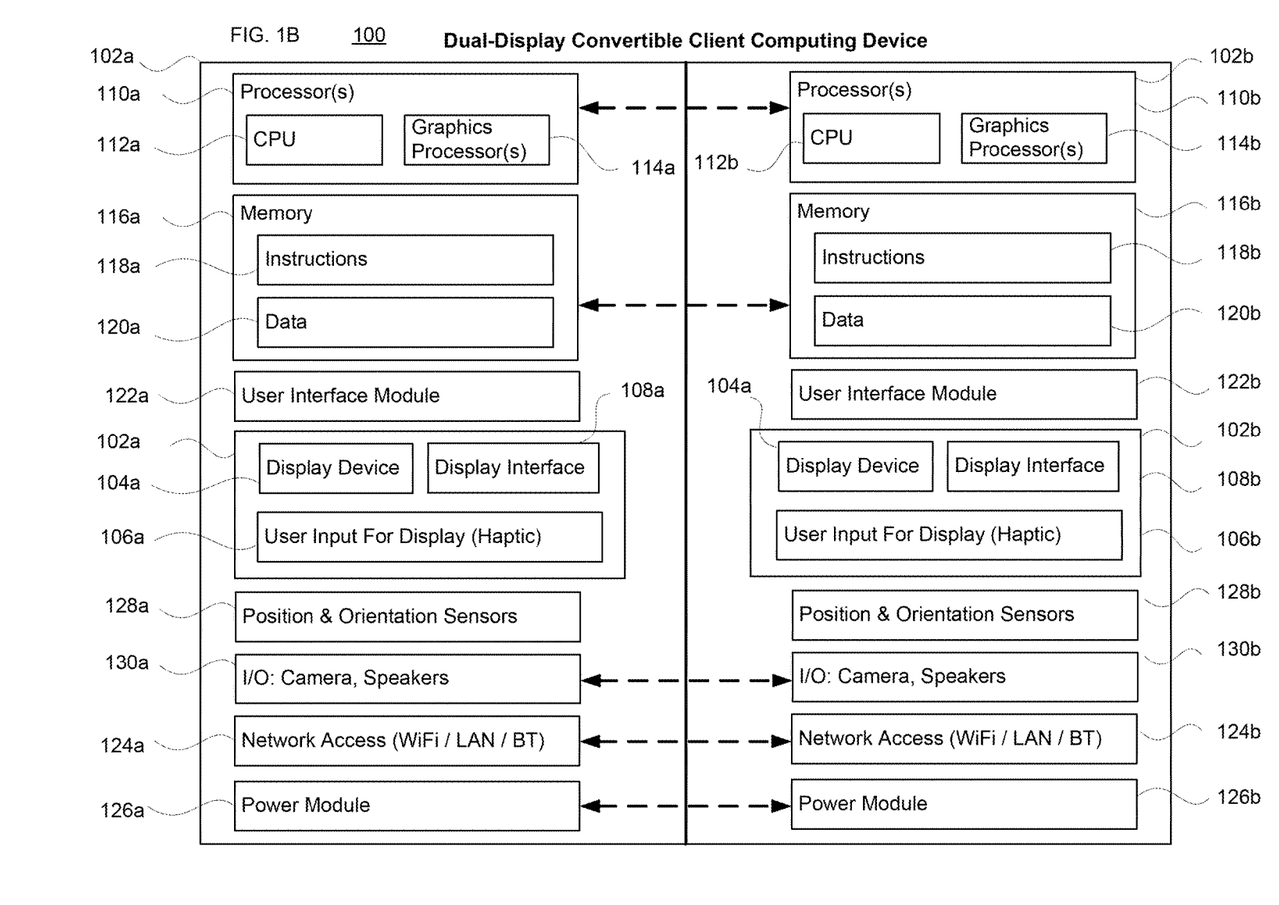

FIGS. 1A and 1B illustrate an example dual screen client apparatus 100. As shown in FIG. 1A, the apparatus 100 includes a first display housing 102a and a second display housing 102b. The display housings may be physically coupled to one another by mechanical and/or magnetic connections, or the like.

Each housing includes a respective display device 104a or 104b. By way of example, the display devices 104 may be TFT LCD (Thin-Film-Transistor Liquid Crystal Display) or OLED (Organic Light Emitting Diode) displays. And as shown in FIG. 1B, each display housing 102 also includes respective user input(s) 106a, 106b, and display interfaces 108a, 108b. The user input(s) 106 for each display housing may include a haptic-type touch screen element such as a capacitive or resistive touch screen with a tactile feedback element. In addition or alternatively, one or more user inputs 106 may be physical input buttons, keys, switches, dials, slides, a microphone, a mouse, a pen input, trackball, etc. In addition to visual feedback via the display devices, the system may provide audio feedback via a speaker, and/or tactile feedback via the haptic touch screen.

Other components of the client apparatus 100 are also shown in FIG. 1B. Each housing preferably includes one or more computer processors 110a or 110b such as a central processing unit 112a or 112b, and/or graphics processors 114a or 114b. Each housing also includes memory 116a or 116b, which is configured to store respective instructions 118a or 118b, as well as data 120a or 120b. The processors within each display housing 102 may or may not operate in parallel, and may include ASICs, controllers and other types of hardware circuitry. The processors of each display housing are configured to receive information from a user through the respective user inputs 106a and 106b, and user interface modules 122a and 122b, and to present information to the same or different users on the display devices 104a and 104b via the display interfaces 108a and 108b, respectively.

The user interface modules 122 may receive commands from one or more users via the user inputs 106 and convert them for submission to a given processor. Each display interface 108 may comprise appropriate circuitry for driving the corresponding display device to present graphical and other information to the user. By way of example, in each display housing 102 the graphical information may be generated by the graphics processors 114, while CPU 112 manages overall operation of the client device 100.

Memory 116 can be implemented as one or more of a computer-readable medium or media, a volatile memory unit or units, or a non-volatile memory unit or units. The memory 116 may include, for example, flash memory and/or NVRAM, and may be embodied as a hard-drive or memory card. Alternatively the memory 116 may also include DVD, CD-ROM, write-capable, and read-only memories. In one implementation, a computer program product is tangibly embodied in an information carrier. The computer program product contains instructions, such as the instructions 118 that, when executed by one or more processors, perform one or more methods such as those described herein. The information carrier is a computer- or machine-readable medium, such as memory 116. Although FIG. 1B functionally illustrates the processor(s), memory, and other elements of device 100 as being within the same overall block, such components may or may not be stored within the same physical housing. And as discussed below, the processor(s), memory, and other elements of a first one of the display housings may be shared with or used to complement the processor(s), memory, and other elements of a second one of the display housings.

The data 120 may be retrieved, stored or modified by the processors in accordance with the instructions 118. For instance, although the claimed subject matter is not limited by any particular data structure, the data may be stored in computing device registers, in a relational database as a table having a plurality of different fields and records, XML documents or flat files. The data may also be formatted in any computing device-readable format.

The instructions 118 may be any set of instructions to be executed directly (such as machine code) or indirectly (such as scripts) by the processor(s). For example, the instructions may be stored as computing device code on the computing device-readable medium. In that regard, the terms "instructions" and "programs" may be used interchangeably herein. The instructions may be stored in object code format for direct processing by the processor(s), or in any other computing device language including scripts or collections of independent source code modules that are interpreted on demand or compiled in advance. Functions, methods and routines of the instructions are explained in more detail below.

As also shown in FIG. 1B, the dual screen client apparatus 100 includes one or more communication devices 124a and 124b for communicating with other devices and systems. The communication devices may include a transceiver in each display housing 102. The transceiver may be a wireless transceiver and/or a wired transceiver, which may provide a local area network (LAN), cellular-type or ad-hoc connection with one or more other devices. The client apparatus 100 may communicate with other remote devices via these connections using various configurations and protocols, including short range communication protocols such as Near-Field Communication, Bluetooth™, Bluetooth™ LE, WiFi and the like, and communicate via the Internet, intranets, virtual private networks, wide area networks, local networks, or private networks using communication protocols proprietary to one or more companies. The communication may also include various combinations of the foregoing.

Each display housing 102a or 102b desirably includes a respective power module 126a or 126b. Each power module may include a receptacle for connection to an external power source, a transformer and/or power regulator circuitry, as well as a battery. The battery may be internal to the housing and part of the power module.

In addition, the client apparatus 100 as shown may include one or more position and orientation sensors 128a or 128b, respectively. The position and orientation sensors are configured to determine the position and orientation of one or both of the display housings 102. For example, the sensors may include a GPS receiver to determine latitude, longitude and/or altitude, as well as an accelerometer, gyroscope or another direction/speed detection device. In this example as shown, the client apparatus 100 also includes one or more input/output devices 130a or 130b. Such output devices may comprise one or more cameras or other imaging sensors for capturing still images and recording video streams, as well as one or more speakers for sound output.

The dashed lines in FIG. 1B indicate that a component or device within one of the display housings may be communicatively coupled with a complementary component or device within the other one of the display housings. For instance, when the display housings 102a and 102b are physically coupled together, the processors 110a and 110b are preferably communicatively coupled via a wired or short range direct wireless connection. Similarly, the memories 116a and 116b may be communicatively coupled to one another. Such communicative coupling may also occur for the communication devices 124, power modules 126, and I/O devices 130. The communicative coupling may be a direct connection, or an indirect connection via one or more other components of the client apparatus 100, such as the processors. This is discussed in detail below.

Example Methods and Use Cases

As noted above, features of the technology can be implemented in a variety of use cases. Examples of such scenarios are discussed below and with reference to the accompanying figures.

Figure 2:
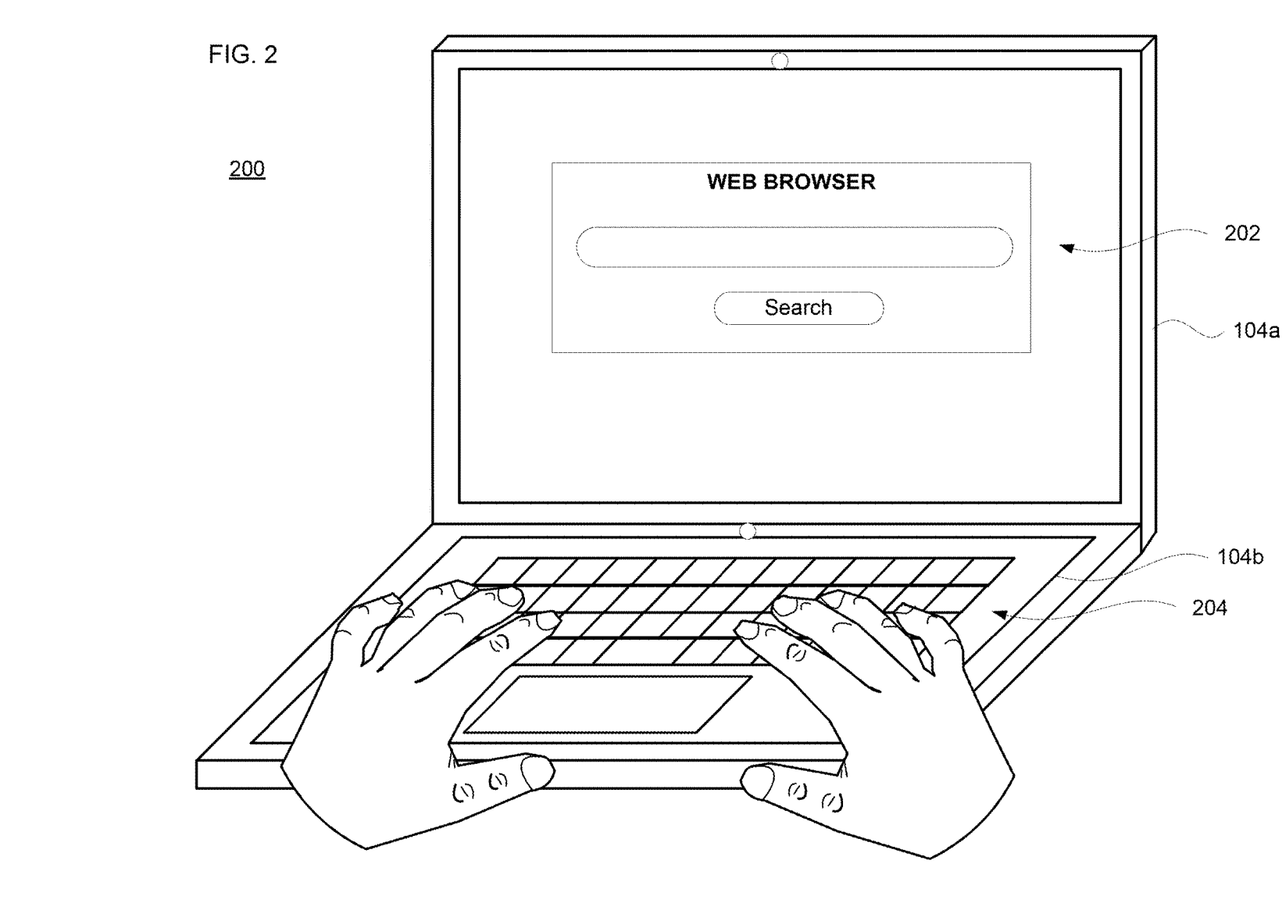
FIG. 2 illustrates an example search query use case according to aspects of the disclosure.

FIG. 2 illustrates a scenario 200 that may occur when the two display housings are physically coupled together. In this example, the scenario 200 involves a user entering a search query into a particular application such as a web browser. In this scenario, the user may open or otherwise access the apparatus 100, which provides a graphical user interface (GUI) 202 on display device 104a, which is the display screen arranged facing the user. The display device 104b presents a user input 204 including a virtual keyboard and mousepad as shown. As noted above, the user input may be a haptic-type touch screen element to enable the user to type and otherwise input information via the display device 104b, and to provide tactile feedback when the screen is pressed.

While the GUI 202 is shown on display device 104a and the user input 204 is shown on display device 104b, the situation may be reversed depending on the arrangement of the two display devices relative to the user. For instance, if the display device 104b were arranged to face the user while the display device 104a were placed on the user's lap or a table top, then the GUI would be presented on display device 104b while the user input is presented on display device 104a. By way of example only, one or more of the processors of either display housing 102, when coupled with a position or orientation sensor in either housing, may control whether content and/or input are presented on either display device.

Figure 3:
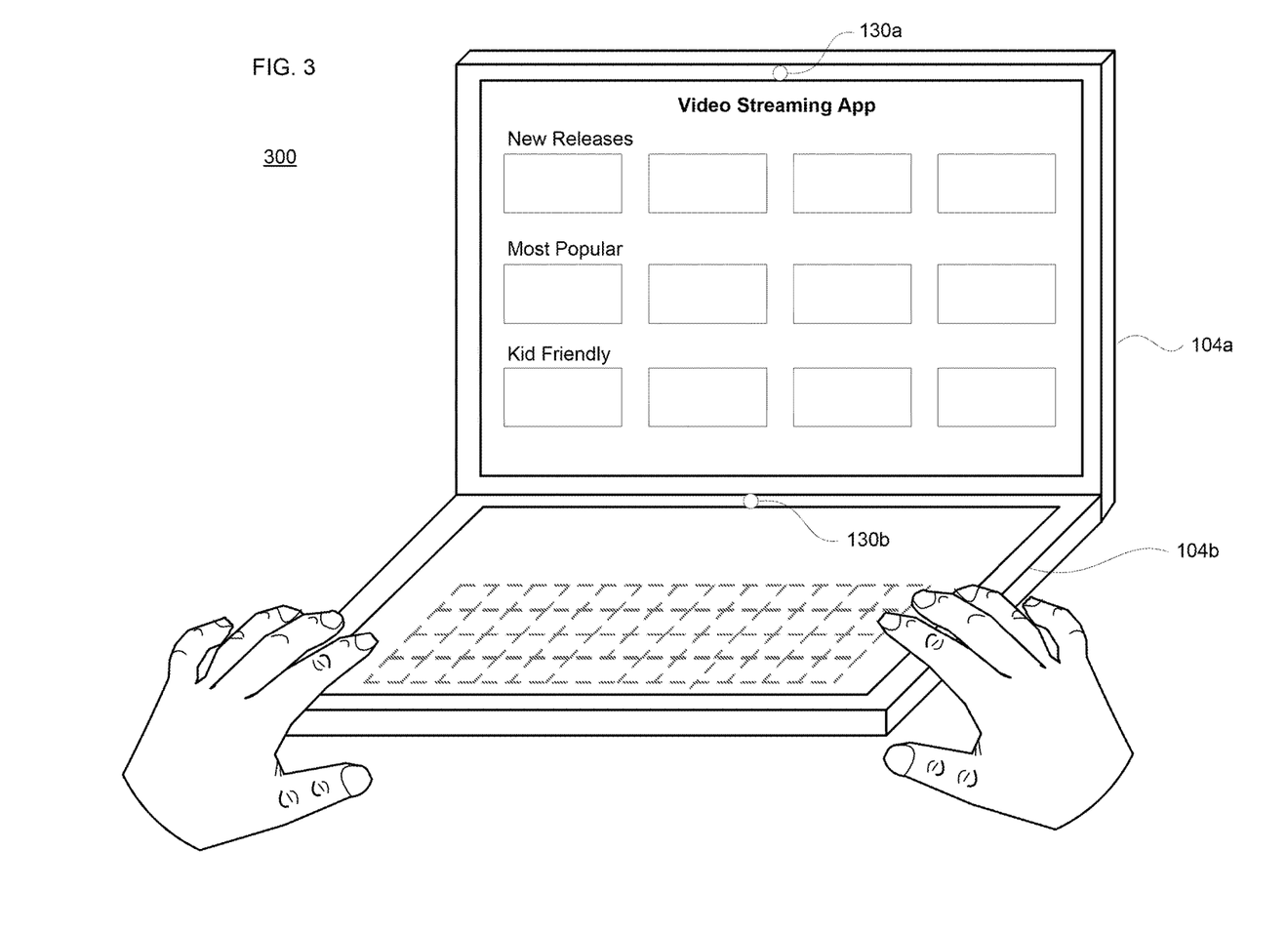
FIG. 3 illustrates an example application use case according to aspects of the disclosure.

FIG. 3 illustrates another scenario 300 that may occur when the two display housings are physically coupled together. Here, the user may access content, such as a video streaming application. Videos or other imagery may be presented on display device 104a, while the user input such as a virtual keyboard is presented on display device 104b. And as above in scenario 200, changing the relative position or orientation of the display housings may enable the system to swap the videos to display device 104b while the virtual keyboard is moved to display device 104a.

In addition or alternatively to using the virtual keyboard or other tactile input in these scenarios, the dual screen client apparatus 100 may be configured to enable input via gesture control. By way of example, information obtained by cameras positioned on the two display housings can detect the location of a user's hand or finger, and use the detected location to operate a control, e.g., control a cursor, scroll the display, change the volume, start or stop a video, answer a video conference call, etc.

For instance, one or more processors of each respective display housing are configured to receive imagery information from the camera(s) mounting on that display housing, as well as position and/or orientation information from sensors 128. Furthermore, when the camera(s) of each display housing are positioned at some non-planar angle to one another, the combined imagery information obtained may enable the processors to identify accurate three-dimensional positions of the user's hand or finger, further enhancing the gesture control. Thus, when the two display housings are positioned as shown in FIG. 2 or FIG. 3, at approximately 90 degrees to one another (e.g., between 75-105 degrees), the cameras are angled or generally perpendicular to one another to enable enhanced gesture input.

Mounting cameras in this manner also enables the client apparatus to create a three-dimensional (3D) composite camera system that can generate 3D images. This would permit the user to conduct a 3D video conference to create a more realistic experience. Similar to the discussion above, one or more of the processors of the client apparatus would take the received imagery information from the cameras, take the position and/or orientation information from the sensors, and generate 3D imagery (including videos) from the combined information.

The scenarios discussed above show that the dual screen client apparatus 100 may function as a laptop or other portable client device. Here, where the two display housings are physically coupled together, the processors and other components of each housing may operate collectively to provide a more robust system than when the display housings are separated and used individual.

For instance, returning to FIG. 1B, the computing power and resources of the processors 110, 112 and 114 of both display housings may be shared when the two devices are connected together. Combining processing power means that the client apparatus can be a more powerful computing device when the display housings are coupled. Here, a physical or virtual bus may connect the processors of both housings. In one example, the processors operate as a multicore parallel processing system. For instance, the graphics processors 114a and 114b may each process selected threads to enhance the graphics rendering process. And the CPUs 112a and 112b may parse instructions and data more quickly when acting in concert.

Alternatively, the system can operate as a master-slave processing system. Here, one of the CPUs, such as CPU 112a, would act as the "master" device while the other CPU such as CPU 112b, would act as the "slave" device. Which device acts as the master and which as the slave could be prearranged, or can change depending on various factors experienced by the apparatus 100. For instance, if CPU 112a is managing communication with an external network and CPU 112b is presenting streaming content to a user, the system may select CPU 112a as the master and CPU 112b as the slave, or vice versa.

Similarly, the memories 116a and 116b may be utilized as shared resources, for caching, buffering and/or longer term storage. For instance, buffing between the two memory systems 116a and 116b may be virtually aggregated to aid in complex calculations, to improve the storage for streaming content, or for saving real-time game play data. And instructions and data could be shared between hard drives or solid state memories of the two housings depending on which processors are executing operations at a given point in time.

Another way in that the client apparatus conserves resources is by sharing the resources of the two power modules. For instance, connecting the two housings together enables power sharing or battery charging, e.g., via a common power bus. In one example, the internal battery of each display housing can be charged from a single connection to an external power source. Thus, the apparatus would only need one power cord to charge both housing's batteries when coupled together.

While each housing preferably includes its own power receptacle to receive a power cable, it would only be necessary to plug in one cable to charge both batteries. This reduces the need to have a second power cord, which is an added expense and can lead to unnecessary clutter. The power cord may magnetically snap to either of the display housings to ensure a secure fit and proper charging. Optionally, in the case where separate power cords are plugged into each display housing, one or more of the processors may be configured to arrange rapid charging of the batteries of one of both of the display housings. For instance, the processor(s) may identify which battery has a lesser amount of charge, and adaptively supply current to that battery to safely charge it as quickly as possible within the charging specifications for that battery.

In an alternative, only one of the two display housings needs to include an external power receptacle. In this case, the battery of the display housing without an external power receptacle is charged via power supplied by the other display housing. In another alternative, the charging of each of the batteries can be performed via inductive charging, thereby potentially eliminating the need for a separate power cord.

Another way that the client apparatus can perform as a more enhanced device when the two display housings are connected together is by virtually aggregating the network access elements. By way of example, the WiFi or LAN transceivers in each of the display housings may provide separate connections to the Internet or other remote network. One or more of the processors of the client apparatus, e.g., one or both of the CPUs 112, may manage uplink and downlink data transfer for each transceiver. This permits the apparatus to effectively double its bandwidth, for instance to receive streaming content or game play information on the downlink. Similarly, file uploads to the cloud or a remote server can be on the order of twice as fast as that of a single transceiver. This would improve performance for productivity applications and make browsing the web, editing and uploading video, etc., that much faster, which can substantially enhance the user experience.

Figure 4A:
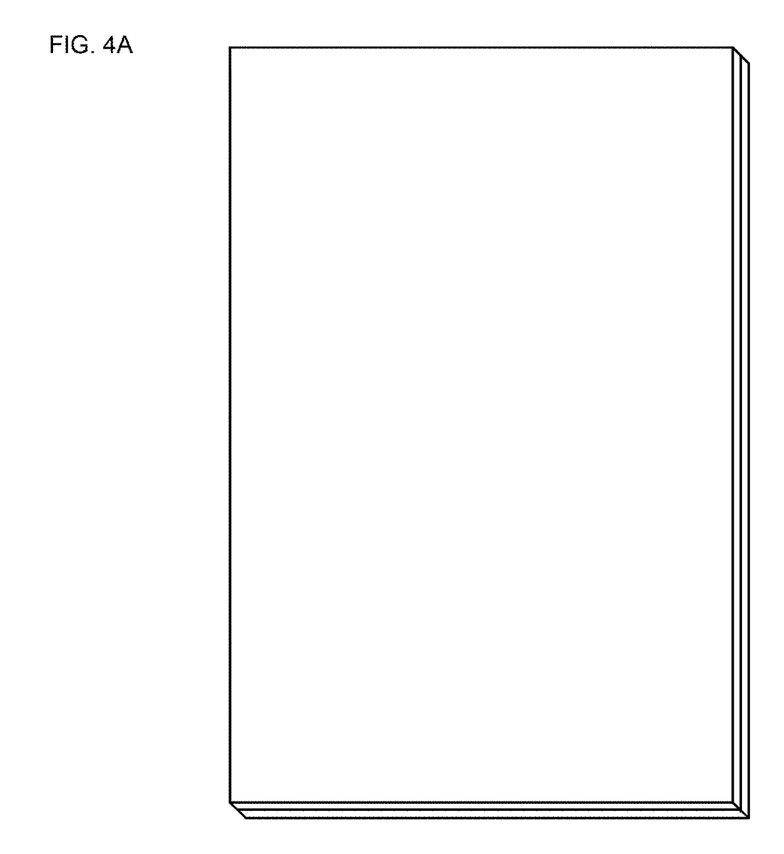
FIG. 4A illustrates an example of a dual display client device arrangement in a closed connected configuration according to aspects of the disclosure.
Figure 4B:
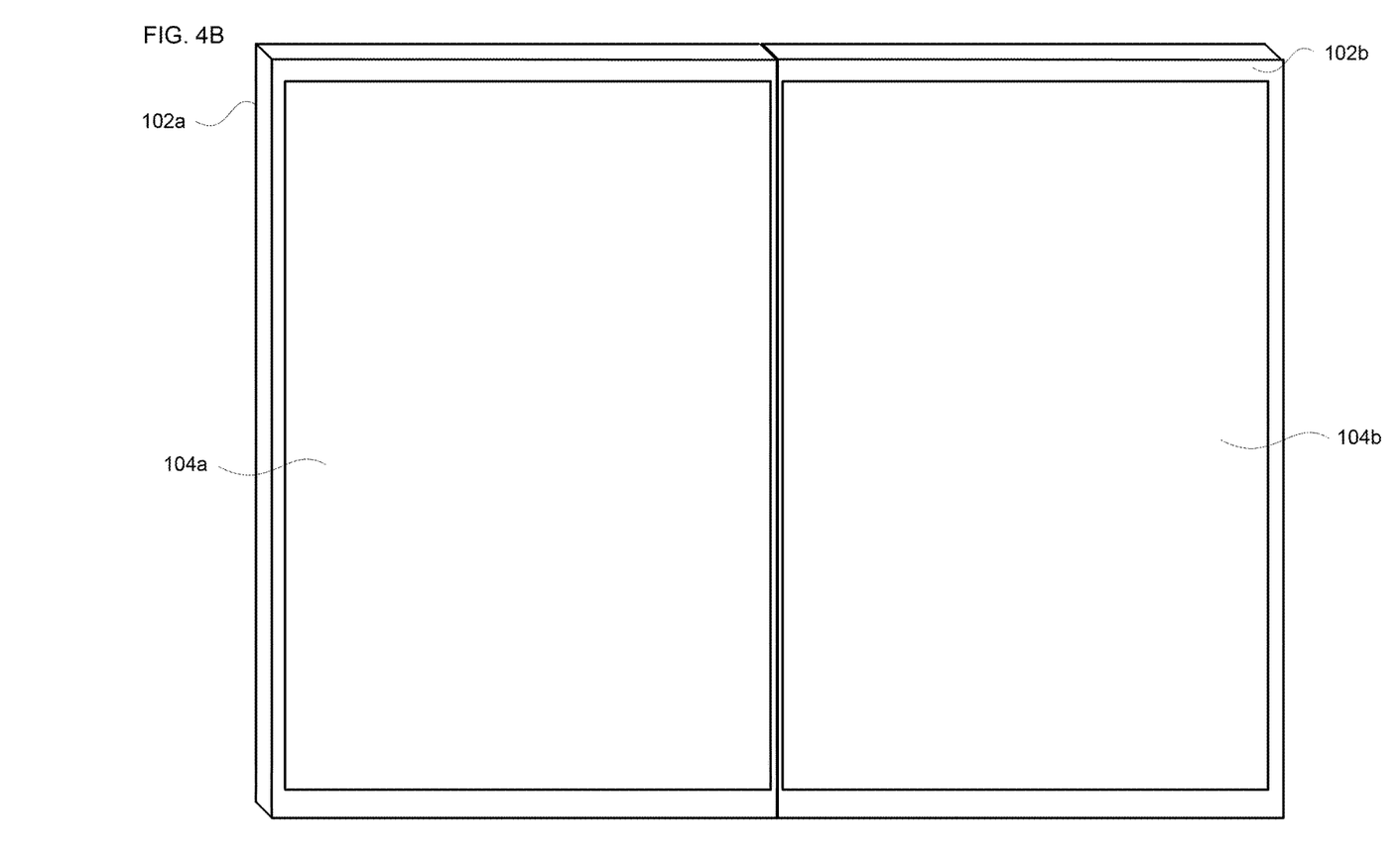
FIG. 4B illustrates an example of a dual display client device arrangement in an open connected configuration according to aspects of the disclosure.

Turning next to FIGS. 4A and 4B, these figures illustrate examples of the client apparatus in closed and open configurations, respectively. As seen in the exemplary open configuration of FIG. 4B, the display devices 104a and 104b may extend nearly to the edges of the display housings 102a and 102b. By way of example only, the screens of the display devices may be on the order of 3-5 cm or no greater than 10 cm from the edges of the housings. Providing displays with pixels extending as close to the edge of the device (at least along the edge where the two housings meet) enables the user to flatten out the apparatus with both screens connected. This effectively provides one large composite screen with which to watch content such as a larger form movie or to view panoramic images, etc. By arranging the display screens of the client apparatus in this manner enables it to function as a small TV, clamshell computer, or two independent media pads depending on what the user wants to do and what applications he or she is using.

Figure 5A:
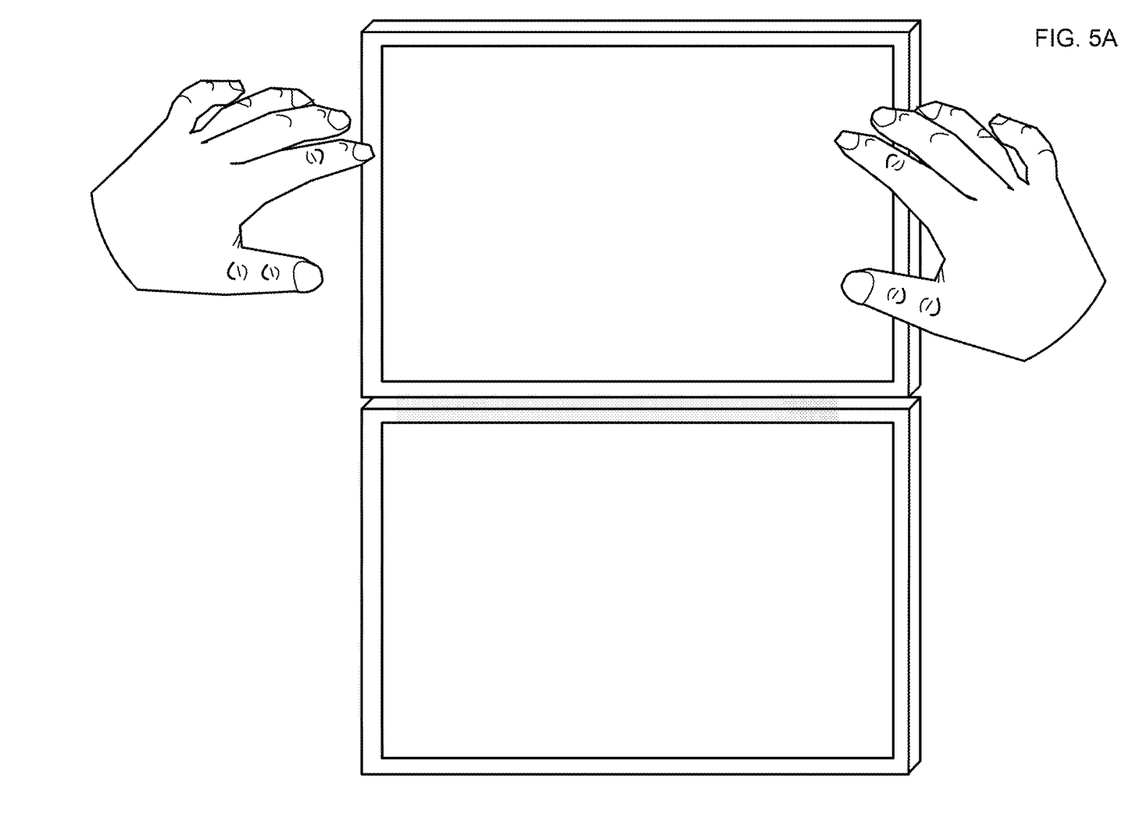
FIGS. 5A-5C illustrate operation of a dual display client device arrangement according to aspects of the disclosure.
Figure 5B:
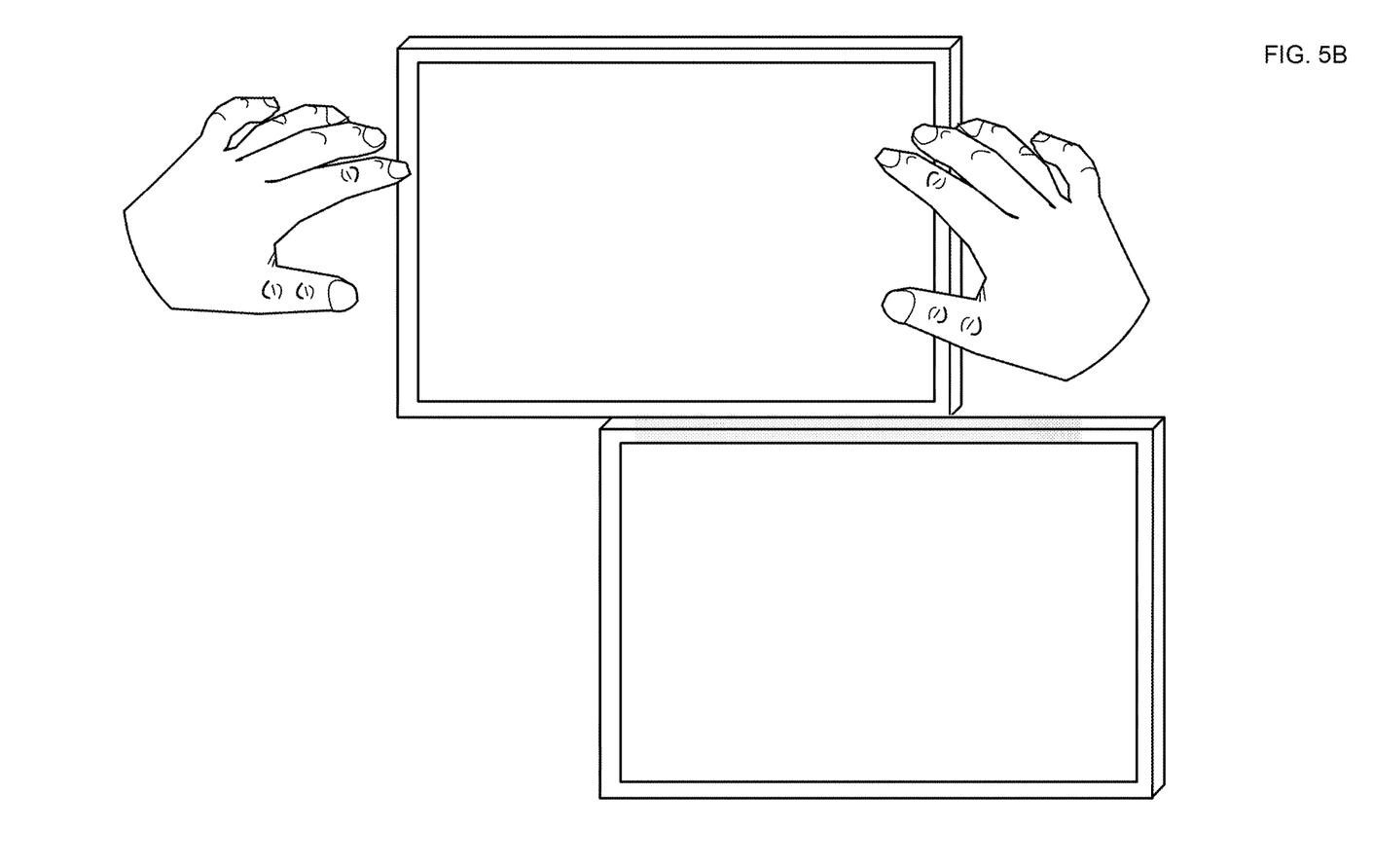
Figure 5C:
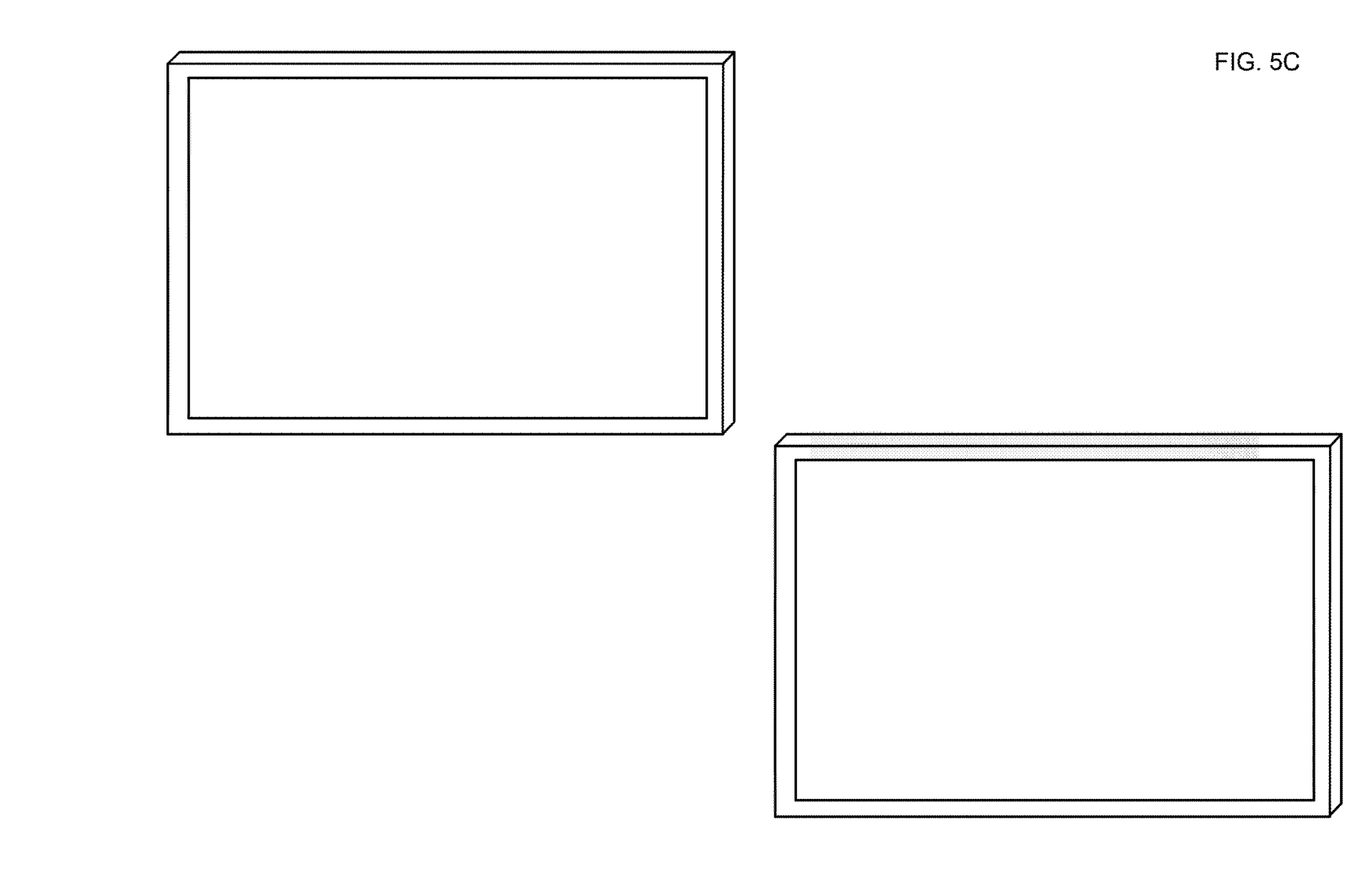

FIGS. 5A, 5B and 5C illustrate a situation when the two display housings are physically separated from one another. This may be done by sliding the housings apart or otherwise decoupling them. Upon physical separation, each display housing is configured to operate as a standalone apparatus. Each such apparatus may function as a tablet, PDA or other type of computing device, with the ability to run any programs or applications stored on the apparatus or that is accessible via a wired or wireless computer network.

In one scenario, once the display housings are physically separated, certain resource sharing may be disabled. For instance, each housing may only use its on-board processor(s), memory, I/O devices, power module and network access devices. As noted above, when connected the display devices may operate as haptic-enabled devices that receive user input such as through a virtual keyboard and provide touch-based feedback to the user. However, to conserve the battery, haptic feedback may be disabled—at least for some applications—when the display housing is operating as a standalone device.

Each standalone device may operate separately, thus allowing different users to access different applications and content on their respective devices. However, in one alternative, the standalone devices are able to communicate with one another via wireless (e.g., WiFi, Bluetooth™ or Near-Field Communications), or wired (e.g., USB, HDMI, IEEE 1394) connections. These different modes of operation enable users to consume content independently or act in a collaborative manner.

For instance, assume that in one scenario the two display housings were connected together as a client apparatus, and two people were watching a movie via a streaming content provider. Here, a single instance of the movie streaming application is running on the client apparatus. When the two display housings are separated, the system allows each user to continue viewing the movie. At this point, the processor(s) of each display housing may run a shared instance or separate instances of the movie streaming application. In the shared instance situation, each user is able to pause, fast forward, rewind, change subtitles, etc., for the version of the movie that he or she is watching, without disturbing or impacting how the other person is viewing the movie. And in the separate instances situation, each user may view different movies or other content on their respective devices. Both situations may occur when the devices share one set of account login information, or when a separate set of account login information is employed by each user or device.

Figure 6:
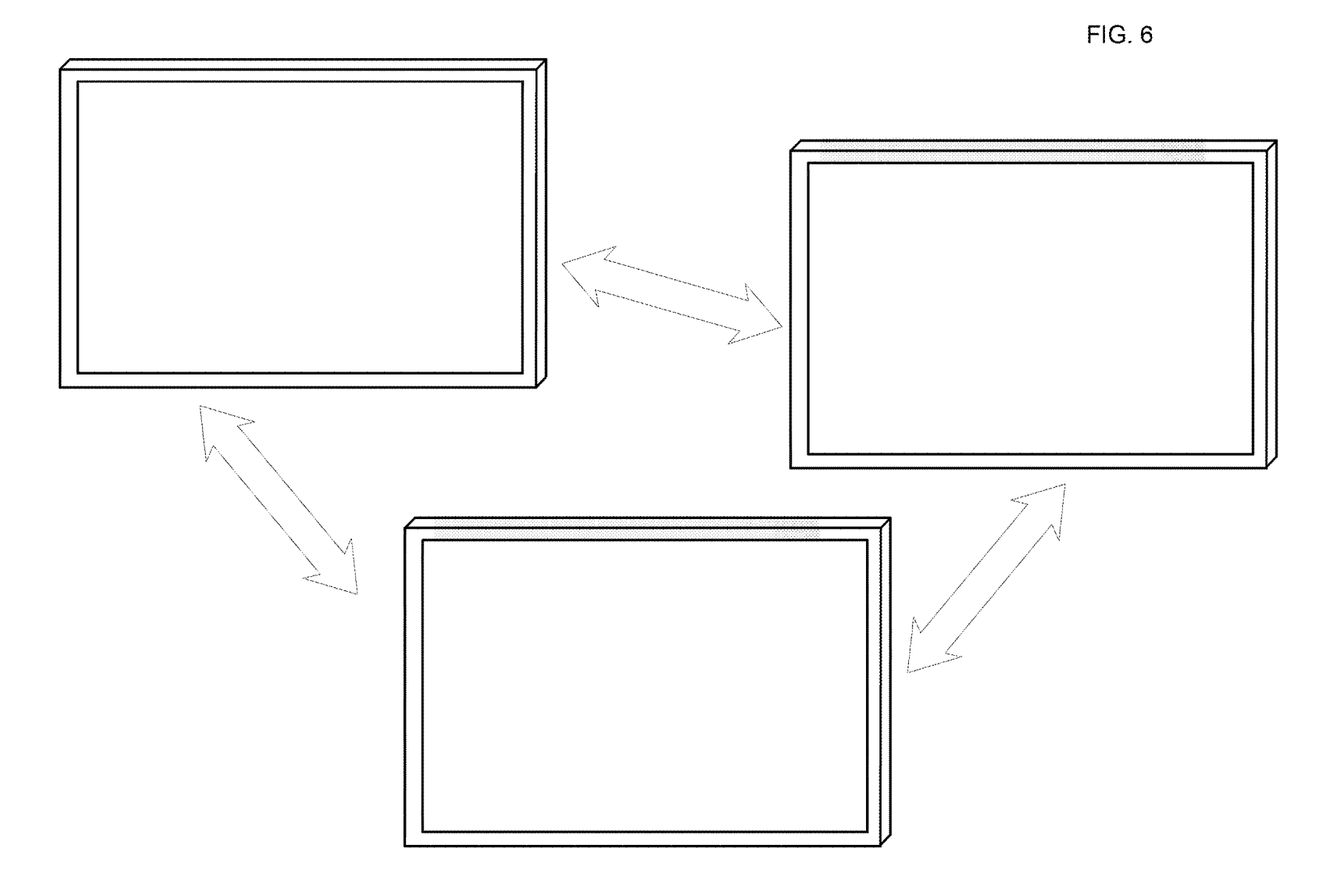
FIG. 6 illustrates operation of a plurality of client devices in accordance with an exemplary embodiment.

In another scenario, the client apparatus may be sold or distributed as a kit including a pair of display housings, one or more power cables, and possibly a networking cable for a wired connection between the pair of display housings. It is also possible to use one or more additional display housings in conjunction with the pair provided in the kit. For instance, as shown in FIG. 6, three display housings may be used by different people, operating them either as individual devices or collaboratively or collectively as a set of networked devices.

This can be a great benefit to a family with several children. Each child could use their own device to play games, watch movies, surf the web, etc. But a pair of the display housings could be physically coupled together to act as a more powerful laptop computer, for instance when one of the children needs to do his or her homework. And if one of the display housings is damaged or lost, an interchangeable replacement may be purchased. Thus, this type of client apparatus system provides great flexibility and potential cost savings to a family, eliminating the need to purchase multiple laptops, tables and PDAs that cannot conveniently share information or accessories such as power cords.

Figure 7:
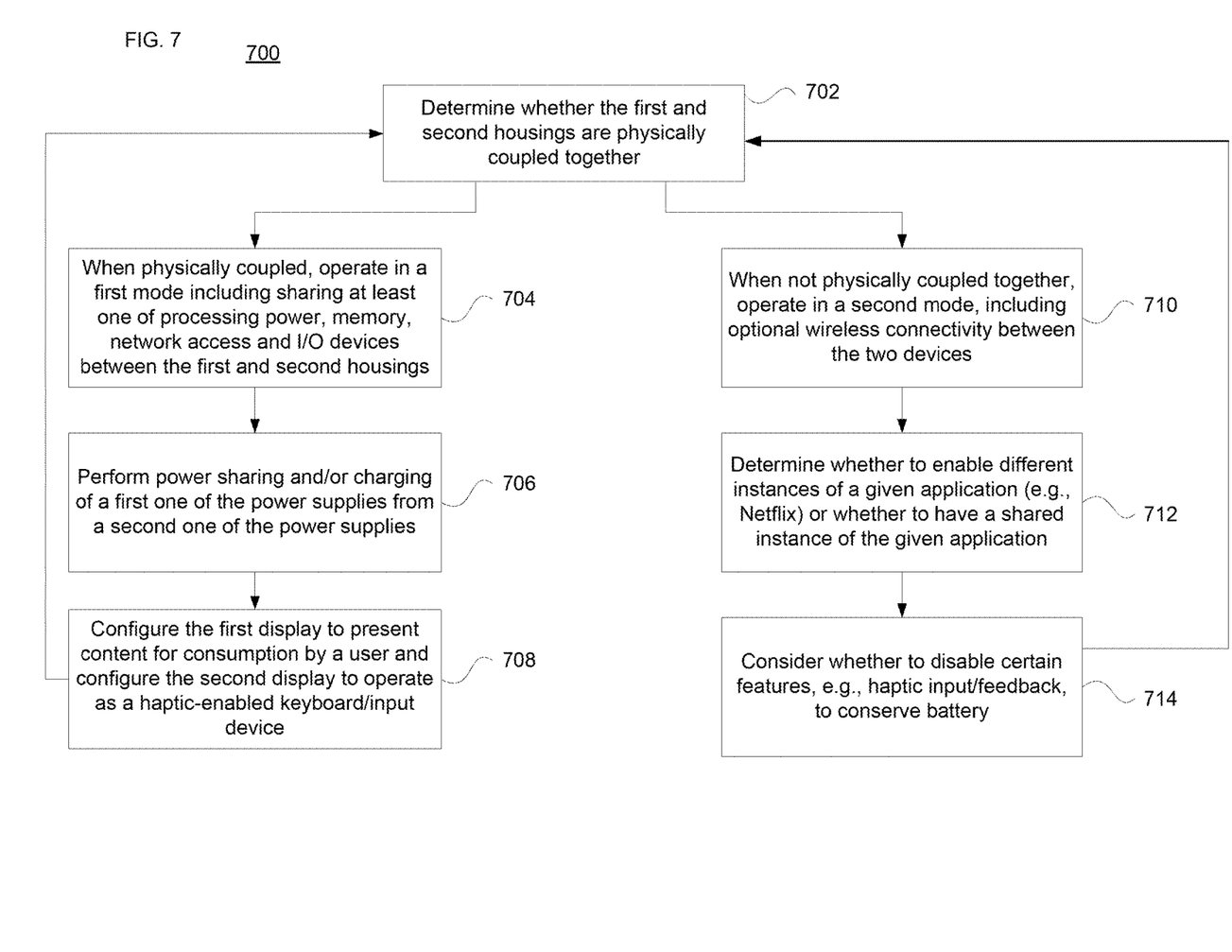
FIG. 7 is a flow diagram of an example method according to aspects of the disclosure.

Turning next to FIG. 7, this illustrates an example flow diagram 700 in accordance with some of the aspects described above that may be performed by one or more processors of the client device. In block 702, the process determines whether a pair of display housings are physically coupled together. As noted above, the coupling may be mechanical, magnetic or another type of physical connection. In block 704, when it is determined that the display housings are physically coupled together, the client device operates in a first mode. This first mode includes sharing certain resources between the two display housings. For instance, any of processing power, buffer and/or long term storage, power (see block 706), network access and input/output devices may be shared. The sharing may be managed by one or more processors of either (or both) display housings. The physical connection may provide one or more of a processing bus, power bus or communication bus between the display housings. Alternatively, the resource sharing may be coordinated via a wireless connection, such as Bluetooth™ or Near Field Commination. Inductive charging may be enabled to charge the battery of one of the display housings from the batter of the other display housing.

According to block 708, one of the display devices is configured to present content for consumption by a user, while the other display device is configured to operate as a haptic enabled keyboard or other input device. While both screens may provide haptic feedback to the user, each one may be arranged to present different information, such as streaming content versus an I/O interface. As noted above, depending on the position and orientation of the apparatus, the respective display devices may switch the information presented on each screen.

As shown in block 710, when it is determined that the display housings are not physically coupled together, the separate devices operate in a second mode. In this mode, the display housings may communicate wired or wirelessly, for instance via WiFi or Bluetooth™. As shown in block 712, the system determines whether to enable different instances of a given application, or whether to utilize a shared instance of the given application. This decision may be made by a processor of either display housing, and may depend on the type of application, whether login credentials are necessary, whether the two display housings are in communication with one another, or other factors. And as shown in block 714, one or more processors of each display housing may consider or determine whether to disable certain features of their respective device. For instance, a decision may be made whether to disable haptic feedback to conserve battery strength or to perform other power saving operations.

The logic and process flows depicted in the figures and described herein are not limited to a particular order or sequence unless expressly stated. In addition, other steps may be provided, or steps may be eliminated, from the described flows, and other components may be added to, or removed from, the described systems.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A portable computing system, comprising:
a first housing including:
a first display device having a display interface;
first memory configured to store first instructions and first data;
one or more first input and output devices;
one or more first sensors devices; and
one or more first processors coupled to the first display device, memory, input and output devices, and sensor devices; and
a second housing including:
a second display device having a display interface;
second memory configured to store second instructions and second data;
one or more second input and output devices;
one or more second sensor devices; and
one or more second processors coupled to the second display device, memory, input and output devices, and sensor devices;
wherein, when the first housing is physically coupled to the second housing, the one or more first processors and the one or more second processors operate collectively in combination in a first mode via a physical or virtual bus to process at least one of the first instructions, the second instructions, the first data or the second data, and in the first mode the second memory is arranged as a shared resource in which the one or more first processors are configured to buffer content in the second memory;
wherein, when the first housing is not physically coupled to the second housing, the one or more first processors operate separately from the one or more second processors in a second mode in which the one or more first processors do not process the second instructions or the second data, and the one or more second processors do not process the first instructions or the first data, and in the second mode:
resource sharing of the second memory by the one or more first processors is disabled;
the one or more first processors are configured to implement a first instance of an active application for use by a first user; and
the one or more second processors are configured to implement a second instance of the active application for use by a second user; wherein the second instance is distinct from the first instance, in which different pieces of content are separately presentable to the first and second users on respective display devices of the first and second housings; and
wherein in the second mode the first and second instances of the active application share one set of account login information.

2. The portable computing system of claim 1, wherein, during the first mode, the first display device is configured to present content to a user, and the second display device is configured to receive input from the user to control presentation of the content on the first display device.

3. The portable computing system of claim 2, wherein the second display device includes a haptic input and is configured to present a virtual keyboard to the user, the virtual keyboard arranged to provide tactile feedback to the user.

4. The portable computing system of claim 1, wherein:
the first housing further comprises a first power module;
the second housing further comprises a second power module; and
in the first mode, one of the first and second power modules is configured to charge a battery of the other one of the first and second power modules.

5. The portable computing system of claim 4, wherein the first power module is configured to inductively charge the battery of the second power module.

6. The portable computing system of claim 1, wherein in the first mode a single instance of the active application is implemented and configured for simultaneous presentation on the first and second display devices.

7. A computer-implemented method for operation of a client apparatus, the client apparatus having first and second housings, each housing including a display device, the method comprising:
determining, by one or more processors of the client apparatus, whether the first and second housings are physically coupled together;
when it is determined that the first and second housings are physically coupled together, operating in a first mode including sharing selected resources between the first and second housings, the sharing selected resources including one or more processors of each of the first and second housings operating collectively via a physical or virtual bus to process instructions and data therebetween, and wherein a memory of the second housing is arranged as a shared resource in which the one or more processors of the first housing are configured to buffer content in the second memory; and
when it is determined that the first and second housings are physically separated from one another, operating in a second mode, the second mode including determining whether to disable one or more features enabled in the first mode, including:
disabling resource sharing of the second memory by the one or more processors of the first housing;
implementing, by the one or more processors of the first housing, a first instance of an active application for use by a first user; and
implementing, by the one or more processors of the second housing, a second instance of the active application for use by a second user, the second instance being distinct from the first instance, in which different pieces of content are separately presentable to the first and second users on respective display devices of the first and second housings; and
wherein in the second mode the first and second instances of the active application share one set of account login information.

8. The computer-implemented method of claim 7, wherein sharing the selected resources between the first and second housings includes combining processor resources of the first and second housings, and wherein combining the processor resources includes operating a processor from the first housing and a processor from the second housing as either parallel processors or as master and slave processors.

9. The computer-implemented method of claim 7, wherein sharing the selected resources between the first and second housings includes virtually aggregating memories of the first and second housings to enhance buffering or long-term storage capacity.

10. The computer-implemented method of claim 7, wherein sharing the selected resources between the first and second housings includes sharing resources of power modules of the first and second housings.

11. The computer-implemented method of claim 10, wherein in the first mode, a power module of the first housing is configured to charge a battery of a power module of the second housing.

12. The computer-implemented method of claim 7, wherein sharing the selected resources between the first and second housings includes virtually aggregating network access elements of the first and second housings to increase uplink and downlink communication bandwidth of the client apparatus.

13. The computer-implemented method of claim 7, wherein upon determining whether to disable one or more features enabled in the first mode, the method includes a processor of the first housing disabling haptic feedback on the display device of the first housing.

14. The computer-implemented method of claim 7, wherein upon determining that the first and second housings are physically separated from one another, the method includes initiating a wireless communication link between transceivers of the first and second housings.

* * * * *